(12) United States Patent
Jin et al.

(10) Patent No.: US 10,971,746 B2
(45) Date of Patent: Apr. 6, 2021

(54) FUEL CELL SYSTEM FOR MODULATING OFFSET OF HYDROGEN PRESSURE SENSOR AND METHOD FOR MODULATING OFFSET OF HYDROGEN PRESSURE SENSOR

(71) Applicants: Hyundai Motor Company, Seoul (KR); Kia Motors Corporation, Seoul (KR)

(72) Inventors: Young Pin Jin, Gyeonggi-do (KR); Sang Bok Won, Seoul (KR); Hyung Kook Kim, Gyeonggi-do (KR); Ki Chang Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 282 days.

(21) Appl. No.: 16/152,360

(22) Filed: Oct. 4, 2018

(65) Prior Publication Data
US 2019/0393524 A1    Dec. 26, 2019

(30) Foreign Application Priority Data
Jun. 22, 2018  (KR) .......................... 10-2018-0072255

(51) Int. Cl.
*H01M 8/04* (2016.01)
*H01M 8/04746* (2016.01)
*H01M 8/0438* (2016.01)
*H01M 8/04537* (2016.01)
*H01M 8/04664* (2016.01)

(52) U.S. Cl.
CPC ... *H01M 8/04753* (2013.01); *H01M 8/04388* (2013.01); *H01M 8/04552* (2013.01); *H01M 8/04559* (2013.01); *H01M 8/04589* (2013.01); *H01M 8/04671* (2013.01); *H01M 2250/20* (2013.01)

(58) Field of Classification Search
CPC ......... H01M 8/04552; H01M 8/04559; H01M 8/04753; H01M 8/04746–04783; H01M 2250/20
USPC ........................................................ 429/431
See application file for complete search history.

(56) References Cited

U.S. PATENT DOCUMENTS

2017/0250421 A1*  8/2017  Saito ................. H01M 8/04753

FOREIGN PATENT DOCUMENTS

KR       2016-0061460 A      6/2016

* cited by examiner

*Primary Examiner* — James M Erwin
(74) *Attorney, Agent, or Firm* — Mintz Levin Cohn Ferris Glovsky and Popeo, P.C.; Peter F. Corless

(57) ABSTRACT

A fuel cell system for modulating an offset of a hydrogen pressure sensor is provided. The fuel cell system includes a stack with a plurality of cells and each cells includes a first electrode to which hydrogen is supplied, a second electrode to which oxygen is supplied, and a membrane electrode assembly arranged between the first and second electrodes to produce electricity by reaction between the hydrogen and the oxygen. The hydrogen pressure sensor is connected to each cell to sense a pressure of the hydrogen supplied to the first electrode. A controller that which of the cells is supplied with insufficient pressure of hydrogen and modulates the offset of the hydrogen pressure sensor connected to the cell to which the hydrogen is supplied with insufficient pressure, to then supply the hydrogen to the first electrode at an appropriate pressure.

9 Claims, 5 Drawing Sheets

FUEL CELL SYSTEM FOR MODULATING OFFSET OF HYDROGEN PRESSURE SENSOR AND METHOD FOR MODULATING OFFSET OF HYDROGEN PRESSURE SENSOR

CROSS-REFERENCE TO RELATED APPLICATION

This application is based on and claims the benefit of priority to Korean Patent Application No. 10-2018-0072255, filed on Jun. 22, 2018, the invention of which is incorporated herein in its entirety by reference.

TECHNICAL YIELD

The present invention relates to a fuel cell system and, more particularly, to a fuel cell system that modulates an offset of a hydrogen pressure sensor and a method for modulating an offset of a hydrogen pressure sensor.

BACKGROUND

A fuel cell system applied to a hydrogen fuel cell vehicle, which is an environmentally friendly vehicle, is capable of producing electricity through electrochemical reaction between hydrogen and oxygen. If the hydrogen pressure is supplied insufficiently, the efficiency of a fuel cell stack may be deteriorated. In the fuel cell system, the hydrogen supply pressure may be adjusted in real time based on the sensor value of a hydrogen pressure sensor.

SUMMARY

An object of the present invention is to provide a fuel cell system capable of periodically modulating an offset generated in a hydrogen pressure sensor of a fuel cell system as a period of use and/or a travel distance increases. The technical problems to be solved by the present inventive concept are not limited to the aforementioned problems, and any other technical problems not mentioned herein will be clearly understood from the following description by those skilled in the art to which the present invention pertains.

According to one aspect of the present invention, a fuel cell system may include a stack including a plurality of cells, wherein each of the plurality of cells include a first electrode to which hydrogen is supplied, a second electrode to which oxygen is supplied, and a membrane electrode assembly arranged between the first and second electrodes to produce electricity by reaction between the hydrogen and the oxygen, the hydrogen pressure sensor connected to each of the plurality of cells to sense a pressure of the hydrogen supplied to the first electrode, and a controller configured to determine which of the plurality of cells is not supplied with an appropriate or sufficient pressure of the hydrogen and configured to modulate the offset of the hydrogen pressure sensor connected to the cell to which the hydrogen is not supplied at the appropriate pressure, to thus supply the hydrogen to the first electrode at the appropriate pressure.

The controller may be configured to calculate a first ratio of an output voltage of each of the plurality of cells to a maximum value of output voltages of each of the plurality of cells and modulate an offset of a hydrogen pressure sensor connected to a cell, the first ratio of which is equal to or less than a specified value. The controller may then be configured to perform a first modulation to adjust the offset of the hydrogen pressure sensor connected to the cell of which the first ratio is equal to or less than the specified value to correspond to a pressure difference between a hydrogen pressure supplied to the first electrode and an oxygen pressure supplied to the second electrode.

Additionally, the controller may be configured to calculate a reference voltage of each of the plurality of cells and a second ratio of the output voltage of each of the plurality of cells to the reference voltage, and modulate an offset of a hydrogen pressure sensor connected to a cell of which the second ratio is less than a specified value. The reference voltage may be decreased as a mileage of the stack is increased. The second ratio may be calculated by a ratio of a reference voltage at a first current to the output voltage at the first current. When a second current different from the first current flows through the plurality of cells, the controller may be configured to convert the output voltage at the second current into a converted voltage at the first current, and the second ratio may include a ratio of the converted voltage to the reference voltage.

The controller may be configured to perform a second modulation to allow an offset of a hydrogen pressure sensor connected to a cell of which the second ratio is less than a specified value to be proportional to a difference (1−second ratio) between '1' and the second ratio. The controller may then be configured to recalculate the second ratio of each of the plurality of cells after performing the second modulation and perform a third modulation for the offset of the hydrogen pressure sensor connected to the cell of which the second ratio is less than the specified value. The third modulation may be performed by adding a specified modulation value to the offset before the third modulation, and the specified modulation value is inversely proportional to a number of second modulations and a number of third modulations.

According to another exemplary embodiment, a method of modulating an offset of a hydrogen pressure sensor may include performing a first modulation and a second modulation. The performing of the first modulation may include measuring cell voltages of a plurality of cells, determining a cell having a relatively low cell voltage by comparing the cell voltages, and performing a first offset modulation of modulating an offset of a hydrogen pressure sensor connected to the cell having the relatively low cell voltage. The performing of the second modulation may include determining a reference voltage of the plurality of cells, calculating a ratio of a cell voltage of each of the plurality of cells to the reference voltage, and performing a second offset modulation of modulating an offset of a hydrogen pressure sensor connected to a cell of which a ratio is less than or equal to the specified value. The first and second modulations may be performed repeatedly.

The performing of the first offset modulation may include modulating the offset of the hydrogen pressure sensor such that the offset of the hydrogen pressure sensor is proportional to a pressure difference between a hydrogen pressure and an oxygen pressure. The performing of the second offset modulation may include modulating the offset of the hydrogen pressure sensor such that the offset of the hydrogen pressure sensor is proportional to a difference (1−ratio) between '1' and the ratio.

The method may further include performing a third modulation after the second modulation, where the performing of the third modulation may include calculating the ratio of the cell voltage of each of the plurality of cells to the reference voltage, and performing a third offset modulation of modulating the offset of the hydrogen pressure sensor connected to a cell of which the ratio is less than or equal to a specified value. The performing of the third offset modulation may include modulating the offset of the hydrogen pressure sensor by adding a specified modulation value to the offset before the third offset modulation, and where the specified modulation value is inversely proportional to a number of times of performing the first and second modulations.

According to an exemplary embodiment, it may be possible to diagnose a cell of the stack even when a vehicle is being driven to determine whether the hydrogen pressure sensor is abnormal, and modulate the offset of the hydrogen pressure sensor. Additionally, it may be possible to more stably supply hydrogen to the stack by periodically modulating the offset of the hydrogen pressure sensor.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
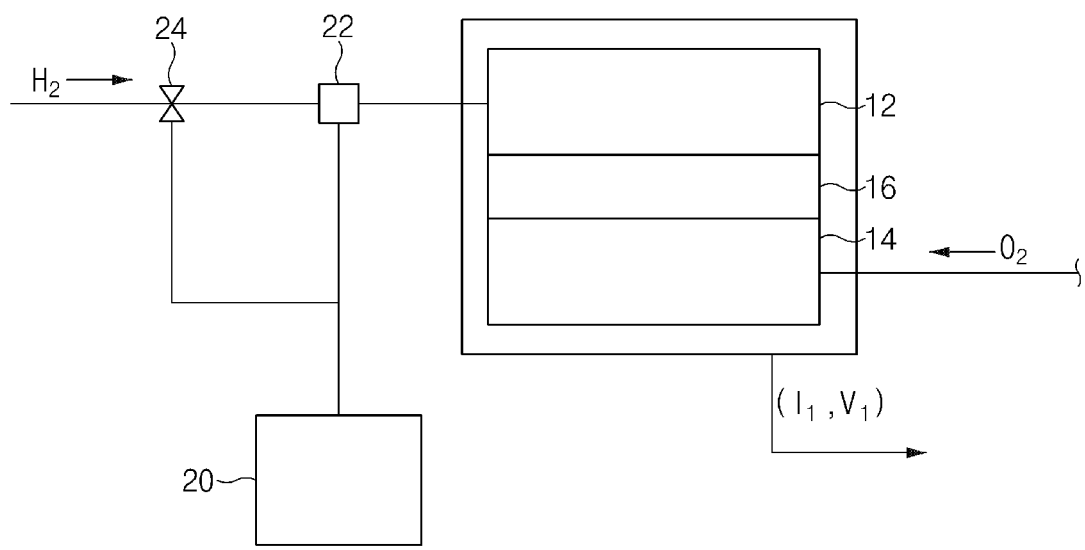
FIG. 1 is a view illustrating a fuel cell system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, exemplary embodiments of the present invention will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present invention.

In describing the components of the present invention, terms like first, second, "A", "B", (a), and (b) may be used. These terms are intended solely to distinguish one component from another, and the terms do not limit the nature, sequence or order of the constituent components. In addition, unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a fuel cell system according to an exemplary embodiment. The fuel cell system 1 according to an exemplary embodiment may include a stack 10 having at least one cell 11, a hydrogen pressure sensor 22 configured to sense a pressure of hydrogen supplied to each cell 11 of the stack 10, and a controller 20 configured to modulate an offset of the hydrogen pressure sensor 22. In each cell 11, electricity ($I_1$, $V_1$) may be produced by the reduction reaction of hydrogen and oxygen. Each cell 11 may include a first electrode 12 (e.g., an anode electrode) to which hydrogen is supplied, a second electrode 14 (e.g., a cathode electrode) to which oxygen is supplied, and a membrane electrode assembly 16 interposed between the first and second electrodes 12 and 14 to allow the hydrogen supplied to the first electrode 12 to pass therethrough.

In addition, hydrogen and oxygen may be supplied to each cell 11. In particular, the hydrogen supplied to the anode electrode 12 may be ionized to separate electrons while passing through the membrane electrode assembly 16. The electrons and hydrogen ions separated from each other may move to the cathode electrode 14 to react with oxygen, thereby generating water. Electricity may be produced in each cell 11 through such a chemical reaction.

The hydrogen supply pressure may be sufficiently high to cause hydrogen moves from the anode electrode 12 through the membrane electrode assembly 16 to the cathode electrode 14. For example, the hydrogen supply pressure may be greater than the oxygen supply pressure. When the differential pressure, which is the difference between the hydrogen supply pressure and the oxygen supply pressure, is insufficient, the electricity production efficiency of the stack 10 may be deteriorated.

In an exemplary embodiment, the hydrogen pressure sensor 22 may be configured to sense the pressure of hydrogen supplied to the anode electrode 12. The hydrogen pressure sensor 22 may be electrically connected to the controller 20 to be operated by the controller 20. The controller 20 may be configured to determine whether an appropriate range of hydrogen pressure is supplied based on the hydrogen pressure sensed by the hydrogen pressure sensor 22.

In particular, an offset may be generated in the hydrogen pressure sensor 22. The offset may be referred to as an error in the sensor. For example, when the hydrogen pressure sensor 22 generates a positive offset, the supply pressure sensed by the hydrogen pressure sensor 22 may be sensed higher than the actual hydrogen supply pressure. The supplied hydrogen pressure is thus not sufficiently high (e.g., insufficient pressure) causing a deterioration in the efficiency of the stack 10. For example, a range of appropriate hydrogen pressure is about 90~200 kPa.

The fuel cell system 1 according to an exemplary embodiment may determine whether an offset is generated in the hydrogen pressure sensor 22 and may modulate the offset. In particular, the controller 20 may be configured to determine whether an offset is generated in the hydrogen pressure sensor 22 connected to each cell 11, based on the performance evaluation of each of the plurality of cells 11 of the stack 10. The controller 20 may then be configured to modulate or vary the offset when an offset is generated in the hydrogen pressure sensor 22. The controller 20 may be configured to calculate an unbalance degree of the cell 11 and measure an output voltage $V_1$ to determine whether an offset is generated in the hydrogen pressure sensor 22. First, the process of determining the unbalance degree of the cell 11 by the controller 20 will be described.

Figure 2:
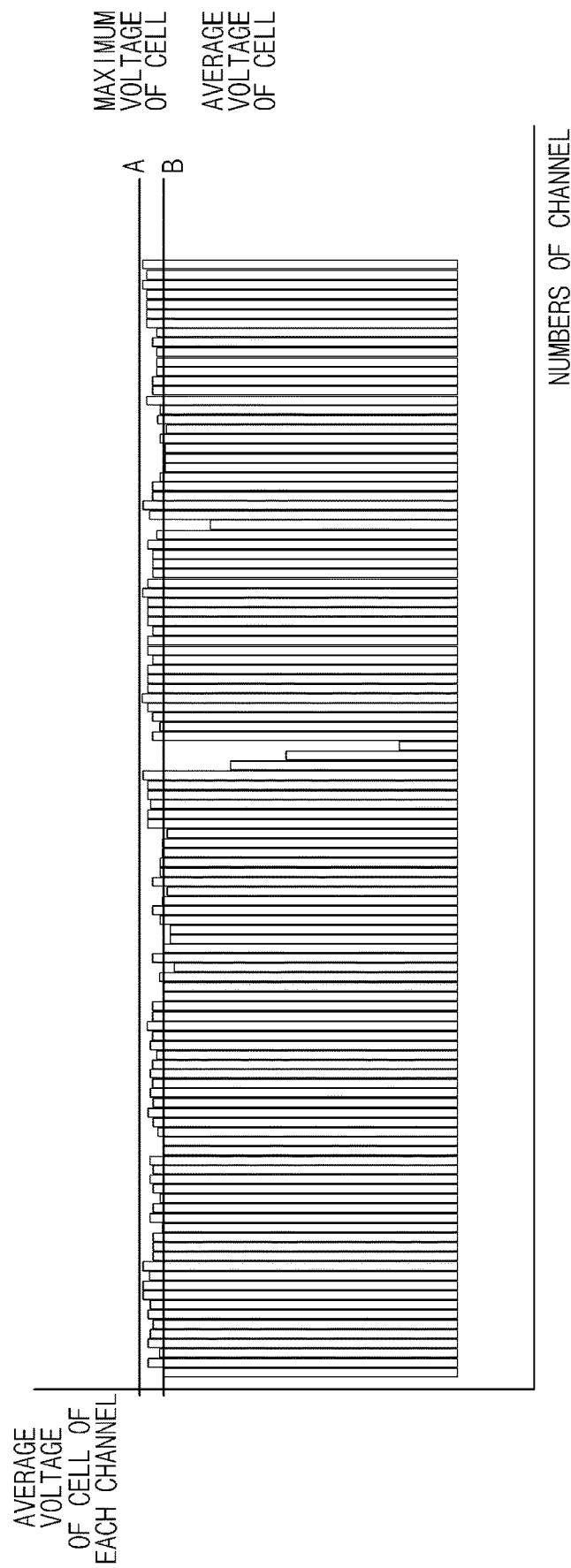
FIG. 2 is a graph illustrating an average cell voltage of each channel of the fuel cell system according to an exemplary embodiment of the present invention.

FIG. 2 is a graph illustrating an average cell voltage of each channel of the fuel cell system according to an exemplary embodiment. Referring to FIGS. 1 and 2, the controller 20 of the fuel cell system 1 may be configured to measure the cell voltage of each cell 11 of the stack 10 or the average cell output voltage of the cell included in the channel. The channel may be configured by grouping at least two of the plurality of cells 11 of the stack 10.

Particularly, the controller may be configured to measure the average cell voltage of each channel of the stack. The controller may then be configured to calculate the unbalance degree of the cell or the channel. The unbalance degree may be defined as the ratio of the average cell voltage of each channel to the maximum value of the measured average cell voltages of each channel.

$$\frac{\text{Average cell voltage of each channel}}{\text{Maximum value of average cell voltage}} < a_1$$

wherein the '$a_1$' which is an arbitrary reference value for determining the unbalance, may be suitably determined based on the type of a cell, a vehicle travelling distance, and the like.

For example, as illustrated in FIG. 2, the average cell voltage of the channels of number '64' to number '66' among the 116 channels is low. The ration of the average cell voltage of each channel to the maximum value is low. Thus, the controller may be configured to determine that the hydrogen of a sufficient pressure is not supplied to the channels of numbers '64' to '66'. Therefore, the controller may be configured to determine that an offset is generated in the hydrogen pressure sensor connected to each cell of the channels of number '64' to number '66'. As described above, the controller may be configured to determine a bad cell or channel by determining the unbalance of the cell or channel. A bad cell or channel may refer to a malfunctioning call or channel.

Additionally, the controller may be configured to modulate the offset of a hydrogen pressure sensor connected to the cell or channel having a low ratio of an average cell voltage to the maximum value of the average cell voltage. Then, the controller may be configured to determine whether the offset is generated in the hydrogen pressure sensor based on the output performance of a cell. The output performance of the cell may be defined as an output voltage with respect to a reference voltage of the cell. The reference voltage may refer to a voltage for allowing a reference current to flow.

Figure 3:
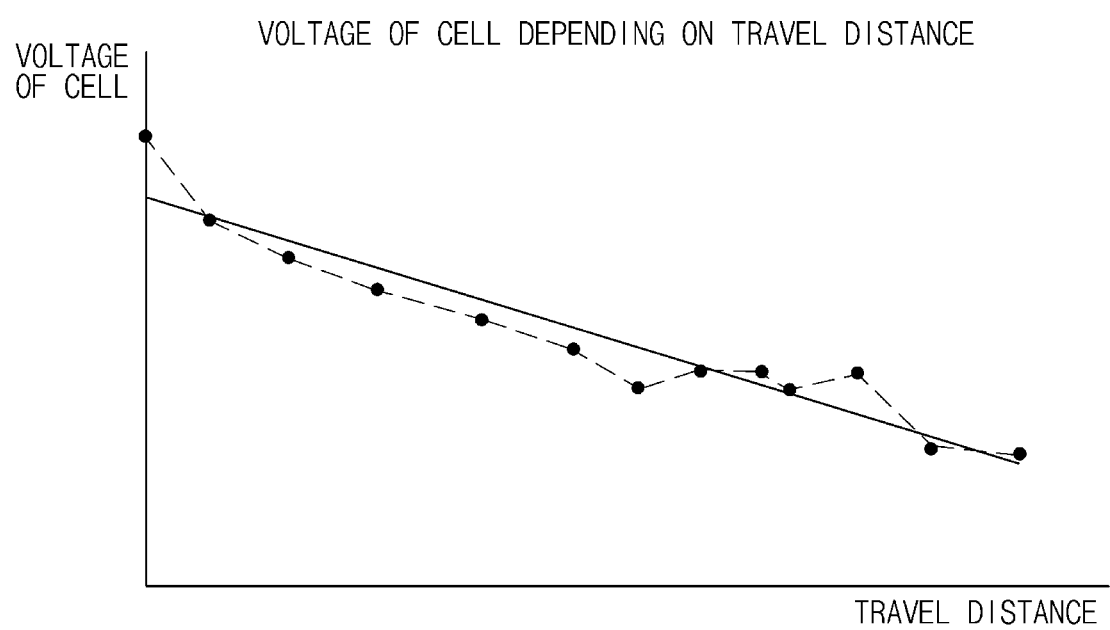
FIG. 3 is a graph illustrating decreasing trends and trend lines of a cell voltage according to a travel distance in an exemplary embodiment of the present invention.

FIG. 3 is a graph illustrating decreasing trends and trend lines of a cell voltage according to a travel distance in an exemplary embodiment. Referring to FIG. 3, the controller may be configured to calculate the reference voltage $V_0$ of each cell constituting the stack or channel based on the travel distance (mileage) of the vehicle. Referring to the graph of FIG. 3, the reference voltage $V_0$ of the stack (e.g., the stack 10 of FIG. 1) may be decreased corresponding to the travel distance (mileage) of the vehicle. The reference voltage of the stack may be changed based on the type of the cell constituting the stack, and the graph of FIG. 3 may be statistically obtained data. For example, the decrease ratio of the reference voltage of the stack may be settled by a ratio to the initial state (e.g., the state where the travel distance is zero).

Referring to the graph of FIG. 3, the cell voltage (e.g., the reference voltage $V_0$) depending on the travel distance may decrease as the travel distance increases. A trend line that represents the trend of the reference voltage $V_0$ may be obtained using the graph. In an exemplary embodiment, the controller may further include a memory capable of storing the graph of FIG. 3. The controller may be configured to measure the output voltage of the cell constituting the stack or channel. The output voltage of the cell may refer to the voltage at which the reference current flows. In particular, the output current of the stack may be less than or different from the reference current. The controller may be configured to replace the output voltage by calculating the converted voltage when the output current is less than the reference current. For example, a range of reference current is about 20~400 A.

Figure 4:
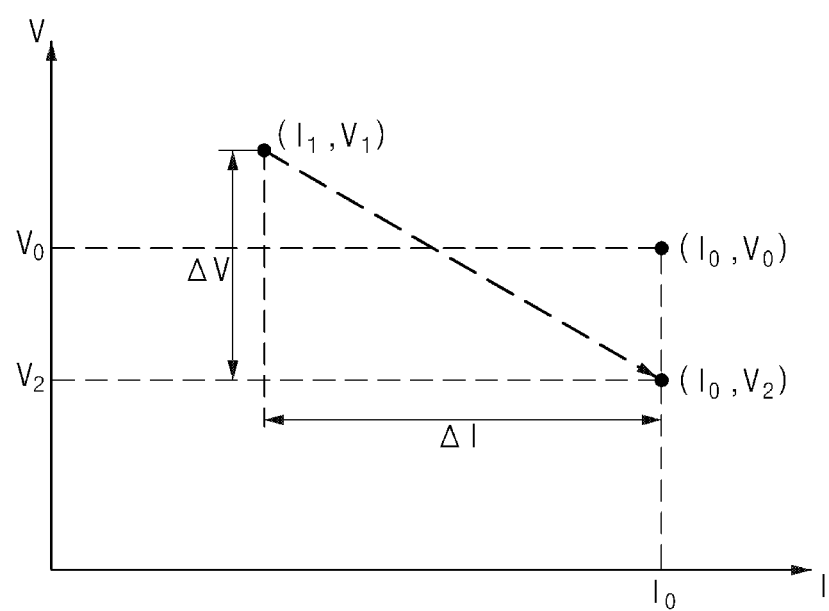
FIG. 4 is a graph illustrating a method of converting an output voltage of a cell when an output current of the cell is different from a reference current in an exemplary embodiment of the present invention.

FIG. 4 is a graph illustrating a method of converting an output voltage of a cell when an output current of the cell is different from a reference current in an exemplary embodiment. In FIG. 4, $I_0$ represents the reference current, $I_1$ and $V_1$ represent the current output current and voltage of the stack, and $I_0$ and $V_2$ represent the reference current and the converted voltage. Referring to FIG. 4, when the output current $I_1$ of the stack is less than the reference current $I_0$, the controller may be configured to convert the output voltage $V_1$ of the stack into the converted voltage $V_2$. For example, when the vehicle is operated in a low output mode, the output current $I_1$ may be different from the reference current $I_0$. The converted voltage $V_2$ may be the output voltage of the stack (e.g., the stack 10 of FIG. 1) at the reference current $I_0$. The converted voltage $V_2$ may be calculated as the following equation.

$$V_2 = \frac{\Delta V}{\Delta I}(I_0 - I_1) + V_1$$

In the graph of FIG. 4, the gradient may refer to the resistance of a cell (e.g., the cell 11 of FIG. 1). As described above, a controller (e.g., the controller 20 in FIG. 1) may be configured to calculate the converted voltage $V_2$ and accurately compare the performance of the cell with respect to the reference voltage $V_0$. When the output current $I_1$ of the cell is different from the reference current $I_0$, the controller may be configured to calculate the converted voltage $V_2$ instead of the output voltage $V_1$ of an actual operating point of a vehicle and use the converted voltage $V_2$ to determine the current performance of the stack.

In addition, the controller may be configured to store the reference voltage $V_0$, the output voltage $V_1$ of the cell and/or the converted voltage $V_2$ of the cell in the memory based on the travel distance (mileage) of the vehicle illustrated in FIG. 3. The controller may be configured to calculate the ratio ($V_1/V_0$) (e.g., when the output current is equal to the reference current) of the output voltage $V_1$ to the reference voltage $V_0$ or the ratio A ($V_2/V_0$) (e.g., when the output current is different from the reference current) of the converted voltage $V_2$ to the reference voltage $V_0$.

$$\frac{\text{Output(converted)voltage}}{\text{Reference voltage}} < a_2$$

wherein the '$a_2$', which is an arbitrary value for determining the performance of a cell, may be appropriately determined based on the type of the cell, the vehicle travel distance, or the like.

Furthermore, the controller (e.g., the controller 20 of FIG. 1) may be configured to determine that an insufficient pressure of hydrogen is supplied to a cell or channel having a low ratio among the plurality of cells or channels. In particular, the controller may be configured to determine that an offset is generated in the hydrogen pressure sensor (e.g., the hydrogen pressure sensor 22 of FIG. 1) when the ratio of the output voltage or the converted voltage to the reference voltage of the cell is equal to or less than the specified value.

In another exemplary embodiment, the controller (e.g., the controller 20 of FIG. 1) may be configured to calculate the difference (output voltage (converted voltage)–reference voltage) between the reference voltage $V_0$ and the output voltage $V_1$ or the converted voltage $V_2$ to determine whether the offset is generated in the hydrogen pressure sensor. The controller may then be configured to modulate the offset of the hydrogen pressure sensor connected to the cell or channel having a low ratio of the output voltage or the converted voltage to the reference voltage.

Figure 5:
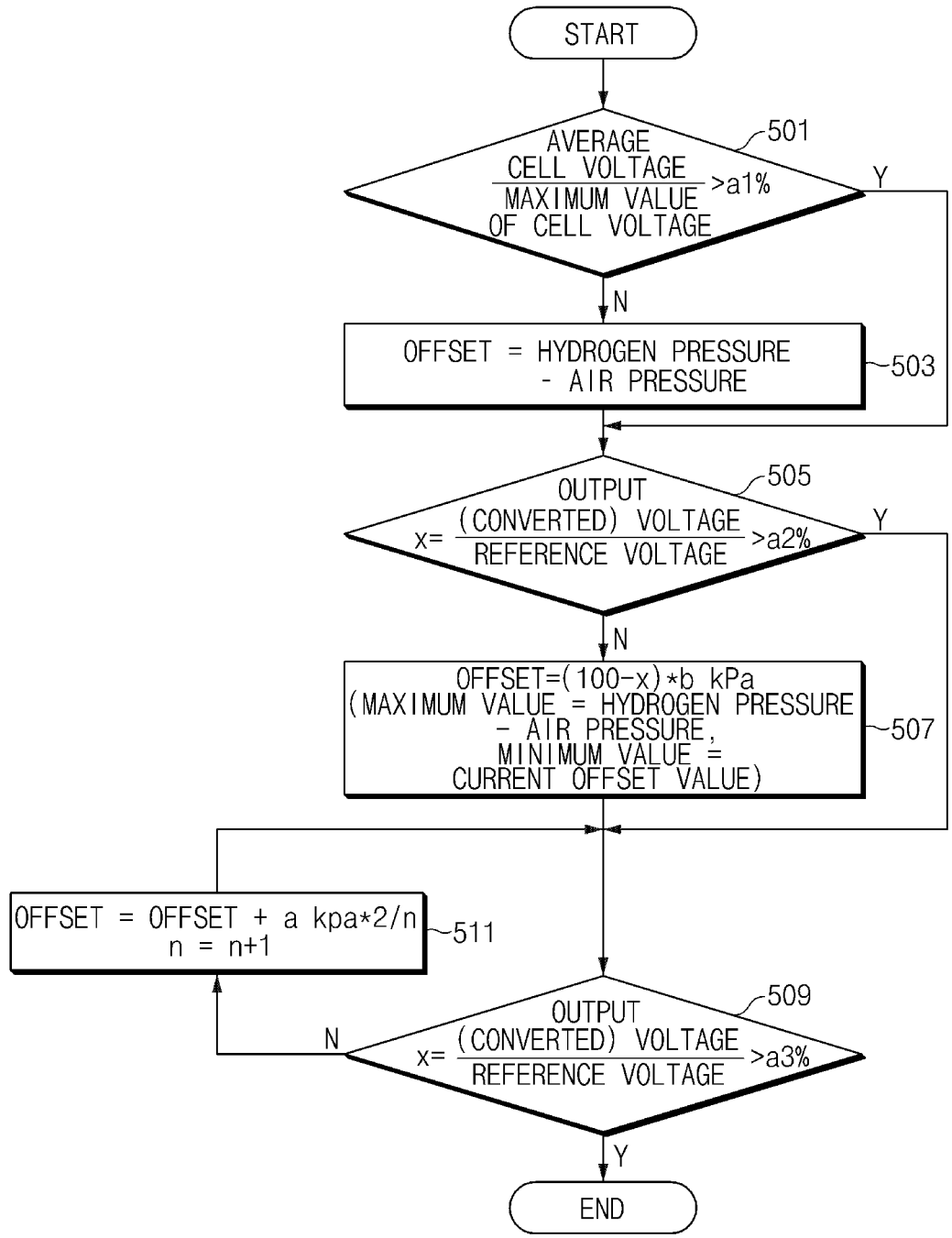
FIG. 5 is a flowchart illustrating a method of modulating an offset of a hydrogen pressure sensor of a fuel cell system in another exemplary embodiment of the present invention.

FIG. 5 is a flowchart illustrating a method of modulating an offset of a hydrogen pressure sensor of a fuel cell system 1 in another exemplary embodiment. Each operation illustrated in FIG. 5 may be performed by a controller (e.g., the controller 20 of FIG. 1) as described above.

In particular, the method may include initializing the number of times of modulating the offset of the hydrogen pressure sensor (501). The initial value may be set to '0', 'n' may denote the number of times of modulating the imbalance of the cell, and 'm' may denote the number of times of modulating the performance deterioration of the cell. As described above, the controller may be configured to initialize the number of modulations before performing the offset modulation and count the number of times of modulation while preceding the control operation.

The initialization of the number of times of modulation may include determining the unbalance of each cell described above with reference to FIG. 2. The controller (e.g., the controller 20 of FIG. 1) may be configured to measure the average cell voltage of each cell (e.g., the cell 11 of FIG. 1) or each channel that constitutes the stack (e.g., the stack 10 of FIG. 1), and calculate the ratio of the average cell voltage of each cell or each channel to the maximum value (e.g., the maximum value of FIG. 2) among them. In particular, when the ratio of all cells or all channels is greater than the specified value '$a_1$', the controller may perform operation 505. When there exists a cell whose ratio is less than the specified value, the controller may perform operation 503.

The operation 503 includes modulating the offset of the hydrogen pressure sensor of the cell where the ratio of the average cell voltage of each cell or each channel to the maximum value of the average cell voltage is less than the specified value. The operation 505 includes determining whether the ratio 'x' of the output voltage '$V_1$' to the reference voltage '$V_0$' of all cells or all channels is greater than the specified value '$a_2$' when the ratio 'x' of the output voltage to the reference voltage of all the cells or all the channels is greater than a specified value in operation 503. As described in FIG. 4, the reference voltage and the output voltage are voltages required to allow a specified reference current to flow. When the output current of the stack is different from the reference current, the converted voltage may be calculated and compared with the reference voltage.

In operation 505, the controller may be configured to calculate the ratio (x) of the output voltage '$V_1$' or the converted voltage '$V_2$' to the reference voltage '$V_0$'. The controller may then be configured to determine that the hydrogen pressure sensor exhibits no errors (e.g., does not malfunction) when the ratio 'x' of all cells or all channels is greater than the specified value '$a_2$' and thus, the controller may terminate the offset modulation of the hydrogen pressure sensor.

When there is a cell in which the ratio 'x' is less than the specified value '$a_2$', the controller may perform operation 507. In operation 507, when there is a cell in which the ratio 'x' is less than the specified value '$a_2$', the controller may be configured to vary or modulate the offset of the hydrogen pressure sensor (e.g., the hydrogen pressure sensor 22 in FIG. 1) connected to the corresponding cell. In particular, the offset may be proportional to a proportional coefficient 'b' and may be proportional to the ratio shortfall (1−x) of the output voltage '$V_1$' or the converted voltage '$V_2$' to the reference voltage '$V_0$'. For example, when the ratio of the output (converted) voltage to the reference voltage is 70%, the offset may be less than that of the case where the ratio is 60%. Thus, the controller may be configured to modulate the offset of the hydrogen pressure sensor.

Similar to operation 505, operation 509 may include recalculating the ratio 'x' of the output voltage '$V_1$' to the reference voltage '$V_0$' of each cell again and determining whether there is a cell of which the ratio 'x' is less than a specified value '$a_3$'. By the modulation in operation 507, the control operation may be terminated when there is no cell of which the ratio 'x' is less than the specified value '$a_3$'. However, when there is a cell of which the ratio 'x' is less than the specified value 'a₃' in spite of operation 507, the controller may further perform operation 511.

Operation 511 may be an additional offset modulation operation for the hydrogen pressure sensor connected to the cell in which the ratio 'x' of operation 509 is less than the specified value 'a₃'. In operation 511, the offset of the hydrogen pressure sensor may be a value obtained by adding a specified value to the existing offset. As an example, the specified value may be inversely proportional to the number 'n' of times of imbalance modulation and may be proportional to a specified proportional coefficient 'k2'. In other words, the modulation value of the modulation performed in operation 511 may be decreased as the number of times of modulation is increased. Operation 511 may be an operation in which a modulation is repeatedly performed to add a minimal value to the existing offset. Thus, it may be possible to approach to the desired control goal without any errors.

Although exemplary embodiments of the present invention have been described for illustrative purposes, those skilled in the art will appreciate that various modifications, additions and substitutions are possible, without departing from the scope and spirit of the invention. Therefore, the exemplary embodiments disclosed in the present invention are provided for the sake of descriptions, not limiting the technical concepts of the present invention, and it should be understood that such exemplary embodiments are not intended to limit the scope of the technical concepts of the present invention. The protection scope of the present invention should be understood by the claims below, and all the technical concepts within the equivalent scopes should be interpreted to be within the scope of the right of the present invention.

What is claimed is:

1. A fuel cell system for modulating an offset of a hydrogen pressure sensor, comprising:
    a stack including a plurality of cells, wherein each of the plurality of cells include a first electrode to which hydrogen is supplied and a second electrode to which oxygen is supplied;
    the hydrogen pressure sensor configured to sense a pressure of the hydrogen supplied to the stack; and
    a controller configured to:
        determine whether an offset is generated in the hydrogen pressure sensor based on a first ratio of an average output voltage of the plurality of cells to a maximum value of output voltages of the plurality of cells; and
        modulate the offset of the hydrogen pressure sensor when the offset is generated in the hydrogen pressure sensor.

2. The fuel cell system of claim 1, wherein the controller is configured to:
    perform a first modulation to adjust the offset of the hydrogen pressure sensor to correspond to a pressure difference between a hydrogen pressure supplied to the first electrode and an oxygen pressure supplied to the second electrode when the first ratio is equal to or less than a first specified value.

3. The fuel cell system of claim 1, wherein the controller is further configured to:
    determine whether the offset is generated in the hydrogen pressure sensor based on a second ratio of the output voltage of each of the plurality of cells to a reference voltage of each of the plurality of cells when the first ratio is more than a first specified value; and
    modulate the offset of the hydrogen pressure sensor when second ratio is equal to or less than a second specified value.

4. The fuel cell system of claim 3, wherein the reference voltage is decreased as a mileage of the stack is increased.

5. The fuel cell system of claim 3, wherein the second ratio is calculated by a ratio of a reference voltage at a first current to the output voltage at the first current.

6. The fuel cell system of claim 5, wherein, when a second current different from the first current flows through the plurality of cells, the controller is configured to convert the output voltage at the second current into a converted voltage at the first current, and wherein the second ratio includes a ratio of the converted voltage to the reference voltage.

7. The fuel cell system of claim 3, wherein the controller is configured to:
    perform a second modulation to allow the offset of the hydrogen pressure sensor to be proportional to a difference between '1' and the second ratio when the second ratio is equal to or less than the second specified value.

8. The fuel cell system of claim 7, wherein the controller is further configured to:
    recalculate the second ratio after performing the second modulation; and
    perform a third modulation for the offset of the hydrogen pressure sensor when the recalculated second ratio is equal to less than a third specified value.

9. A method of modulating an offset of a hydrogen pressure sensor by using the fuel cell system of claim 1, comprising:
    performing, by the controller, a first modulation and a second modulation,
    wherein the performing of the first modulation includes:
        determining, by the controller, whether an offset is generated in the hydrogen pressure sensor based on a first ratio of an average output voltage of the plurality of cells to a maximum value of output voltages of the plurality of cells; and
        performing, by the controller, a first offset modulation of modulating the offset of the hydrogen pre-sure sensor when the first ratio is equal to or less than a first specified value,
    wherein the performing of the second modulation includes:
        determining, by the controller, whether the offset is generated in the hydrogen pressure sensor based on a second ratio of the output voltage of each of the plurality of cell to a reference voltage of each of the plurality of cells; and
        performing, by the controller, a second offset modulation of modulating the offset of the hydrogen pressure sensor when the second ratio is equal to or less than a second specified values, and
    wherein the first and second modulations are performed repeatedly.

* * * * *